United States Patent
Li et al.

(10) Patent No.: US 11,544,105 B2
(45) Date of Patent: Jan. 3, 2023

(54) RECOMMENDATIONS FOR SCHEDULING JOBS ON DISTRIBUTED COMPUTING DEVICES

(71) Applicant: Google LLC, Mountain View, CA (US)

(72) Inventors: Sheng Li, Cupertino, CA (US); Brian Zhang, Fort Lee, NJ (US); Liqun Cheng, Foster City, CA (US); Norman Paul Jouppi, Palo Alto, CA (US); Yun Ni, San Mateo, CA (US)

(73) Assignee: Google LLC, Mountain View, CA (US)

( * ) Notice: Subject to any disclaimer, the term of this patent is extended or adjusted under 35 U.S.C. 154(b) by 563 days.

(21) Appl. No.: 16/600,437

(22) Filed: Oct. 11, 2019

(65) Prior Publication Data
US 2021/0073028 A1 Mar. 11, 2021

Related U.S. Application Data

(60) Provisional application No. 62/899,132, filed on Sep. 11, 2019.

(51) Int. Cl.
| | |
|---|---|
| G06F 9/46 | (2006.01) |
| G06F 9/48 | (2006.01) |
| G06F 9/50 | (2006.01) |
| G06F 9/54 | (2006.01) |
| G06F 11/34 | (2006.01) |

(Continued)

(52) U.S. Cl.
CPC .......... *G06F 9/4881* (2013.01); *G06F 9/5011* (2013.01); *G06F 9/5044* (2013.01); *G06F 9/5066* (2013.01); *G06F 9/545* (2013.01); *G06F 11/3409* (2013.01); *G06F 11/3612* (2013.01);

(Continued)

(58) Field of Classification Search
None
See application file for complete search history.

(56) References Cited

U.S. PATENT DOCUMENTS

| 10,656,970 B2 * | 5/2020 | Xia .................. G06F 9/5094 |
| 2012/0079235 A1 | 3/2012 | Iyer et al. |

(Continued)

OTHER PUBLICATIONS

Extended European Search Report in European Application No. 20195664.6, dated Feb. 4, 2021, 8 pages.

(Continued)

*Primary Examiner* — Bing Zhao
(74) *Attorney, Agent, or Firm* — Fish & Richardson P.C.

(57) ABSTRACT

Methods, systems, and apparatus, including computer programs encoded on computer storage media, for scheduling operations represented as a computational graph on a distributed computing network. A method includes: receiving data representing operations to be executed in order to perform a job on a plurality of hardware accelerators of a plurality of different accelerator types; generating, for the job and from at least the data representing the operations, features that represent a predicted performance for the job on hardware accelerators of the plurality of different accelerator types; generating, from the features, a respective predicted performance metric for the job for each of the plurality of different accelerator types according to a performance objective function; and providing, to a scheduling system, one or more recommendations for scheduling the job on one or more recommended types of hardware accelerators.

33 Claims, 5 Drawing Sheets

(51) Int. Cl.
G06F 11/36 (2006.01)
G06K 9/62 (2022.01)
G06N 3/08 (2006.01)

(52) U.S. Cl.
CPC ............ *G06K 9/6256* (2013.01); *G06N 3/08* (2013.01); *G06F 2209/501* (2013.01)

(56) References Cited

U.S. PATENT DOCUMENTS

2016/0307145 A1  10/2016  Banerjee et al.
2018/0302800 A1  10/2018  O'Shea
2018/0330192 A1  11/2018  Atasu et al.

OTHER PUBLICATIONS

Demoulin, "Studying Recommender Systems to Enhance Distributed Computing Schedulers," Doctoral dissertation, PhD thesis, Duke University, Department of Computer Science, 2016, 86 pages.

Hong et al., "Simulation of adaptive applications in heterogeneous computing environments," International Journal of Computers and Applications 26.3, Jan. 2004, 23 pages.

Karatza et al., "Parallel job scheduling in homogeneous distributed systems," Simulation 79, May 2003, 13 pages.

Li et al., "Design and Implementation of Hardware Accelerator for Recommendation System based on Heterogeneous Computing Platform," 3rd International Conference on Mechatronics Engineering and Information Technology (ICMEIT 2019), Apr. 2019, 6 pages.

Sandokji et al., "Task Scheduling Frameworks for Heterogeneous Computing Toward Exascale," International Journal of Advanced Computer Science and Applications 9.10 (2018), Oct. 2018, 10 pages.

Singhoff et al, "Cheddar: a Flexible Real Time Scheduling Framework," SIGAda, Nov. 2004, 8 pages.

Taghavi et al., "Compute Job Memory Recommender System Using Machine Learning," Proceedings of the 22nd ACM SIGKDD International Conference on Knowledge Discovery and Data Mining, Aug. 2016, 8 pages.

Ying et al., "Graph convolutional neural networks for web-scale recommender systems," arXiv, Jun. 2018, 10 pages.

\* cited by examiner

RECOMMENDATIONS FOR SCHEDULING JOBS ON DISTRIBUTED COMPUTING DEVICES

CROSS-REFERENCE TO RELATED APPLICATIONS

This application claims the benefit under 35 U.S.C. § 119(e) of the filing date of U.S. Patent Application No. 62/899,132, for "JOB SCHEDULING ON DISTRIBUTED COMPUTING DEVICES," which was filed on Sep. 11, 2019, and which is incorporated here by reference.

BACKGROUND

This specification relates to training machine learning models, including neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of network parameters.

Neural networks and other machine learning models can be processed for training or inference on a plurality of computing devices, collectively referred to in this specification as a distributed computing network.

A distributed computing network can be heterogeneous, meaning that the computing devices of the distributed computing network can include one or more different types of processing units, e.g., central processing units ("CPUs"), graphics processing units ("GPUs"), and tensor processing units ("TPUs"), as well as other forms of special-purpose logic circuitry, such as field-programmable gate arrays ("FPGAs"), and application-specific integrated circuits ("ASICs"). A heterogeneous distributed computing network can also include different generations of the same type of processing unit, e.g., the distributed computing network is considered heterogeneous if it includes a combination of first-generation TPUs, second-generation TPUs, and third-generation TPUs.

An individual computing device can be heterogeneous, meaning that the individual computing device can include multiple processing units of different types. In this specification, a distributed computing network that includes a heterogeneous computing device is considered a heterogeneous distributed computing network. A heterogeneous distributed computing network can receive a job representing a set of operations to execute on the network.

SUMMARY

This specification describes technologies for scheduling jobs on a heterogeneous distributed computing network having a plurality of computing devices of a plurality of different computing device types.

These technologies generally involve a recommendation engine configured to receive operations to be executed on the distributed computing network, as part of a job. From the job, the recommendation engine can extract features representing a predicted performance for the job on each type of computing device present in the distributed computing network.

From the features, the recommendation engine can predict a performance metric for each of the different types of computing device present in the distributed computing network. The recommendation engine is configured to generate recommendations for one or more types of computing device to schedule the job to, as well as a quantity specifying the amount of computing resources of each type that is recommended to be assigned. The recommendation can be provided as input to a scheduling system, which can use the predicted performance metrics and other metrics to generate a schedule for partitioning and assigning the computational graph across a plurality of computing devices of the distributed computing network.

The set of performance metrics can be ranked. Higher-ranked metrics can correspond to types of computing devices that are predicted to execute the operations of the computational graph more efficiently than types of computing devices that correspond to lower-ranked metrics.

The scheduler can use the received recommendations in addition to other metrics, such as cost, device availability, and preferences among users requesting scheduling, to more efficiently schedule operations on a distributed computing network than without using the performance metrics.

In some implementations, the recommendation is a report that can be provided to a user and that details different types of computing devices and which types are predicted to perform better than others.

Performance metrics can vary depending on a corresponding objective function used by the recommendation engine to measure performance. Types of performance measured can include run-time performance, energy performance, and cost-to-operate performance, but in general can be any measurement corresponding to performance of the job across the distributed computing network.

Regardless of the type of performance measured by the recommendation engine, the recommendation engine can predict a set of performance metrics even when historical information about the performance of previous jobs on different types of computing devices is sparse or largely unavailable.

In general, one innovative aspect of the subject matter described in this specification includes a recommendation engine configured to generate performance metrics by training and executing a machine learning model. The machine learning model is configured to receive, as input, a computational graph representing the operations of an input job, and generate, as output, a set of performance metrics measuring predicted performance of the computational graph on each type of computing device in the distributed computing network. The recommendation engine can train the machine learning model and generate the set of performance metrics for the computational graph according to an objective function.

The machine learning model can include a graph convolutional neural network ("GCN"). The GCN can be trained to receive, as input, a computational graph for a job, and generate, as output, an embedding representing features of the computational graph. An embedding is a data structure, e.g., a vector, of a relatively lower dimensionality that maps values of a data structure of a relatively higher dimensionality, e.g., an image or a graph. Embeddings represent translations of categorical values as real numbers, and collectively are part of an embedding space. Embeddings in the embedding space can be compared and visually represented as clusters, to facilitate identification of "similar" embeddings, where similarity is defined by an objective function used to train a machine learning model.

The recommendation engine can also include a collaborative filtering system, e.g., a neural collaborative filtering network, that is configured to receive the embedding of the computational graph, as input, and generate, as output, a set of performance metrics according to the objective function. The set includes a performance metric for each type of computing device in the distributed computing network.

The recommendation engine can generate the set of performance metrics without processing a computational graph through a machine learning model. In some implementations, the recommendation engine can be configured to simulate performance of operations of a computational graph across different types of computing devices using a simulator. A simulator can simulate the performance of executing an input computational graph for each type of computing device. The output of the simulator is a set of performance metrics, similar to the machine learning model approach described briefly, above.

The subject matter described in this specification can be implemented in particular implementations, including methods, systems, and computer-readable storage media, so as to realize one or more of the following advantages. A recommendation engine implementing the subject matter described in this specification can generate performance metrics as a recommendation to a scheduler to improve the efficiency of the scheduler in assigning jobs to one or more computing devices in a distributed computing network. The recommendation engine can generate recommendations using sparse historical information about previous jobs executed on computing devices of different types, which would otherwise be unusable to conventional recommendation systems because of a lack of information, i.e., because of the cold start problem.

The cold start problem generally refers to the problem of drawing inferential conclusions from a sparsity of information. For example, the cold start problem can occur in the context of predicting qualitative information about the performance of machine learning jobs across a heterogeneous distributed computing network. Specifically, historical performance for machine learning jobs is limited for a number of reasons.

One reason is because machine learning jobs are generally executed on a distributed network of hardware accelerators. Hardware accelerators are computing devices that include specialized hardware for performing certain types of operations, e.g., matrix multiplication, more efficiently over non-specialized—or "general purpose"—computing devices. Hardware accelerators are generally more computationally efficient than their general purpose counterparts, but are also generally more expensive, both because of the cost of the hardware and associated energy costs to power and maintain the accelerators. As a result, historical information about performance of machine learning jobs on different types of hardware accelerators is generally limited to a few types of hardware accelerators available to a particular user executing the job.

Another reason information of historical performance of machine learning jobs is limited is because of the volatility of machine learning models. Metadata describing the machine learning job, e.g., a job name or architectural characteristics describing the machine learning model for the job, often changes, particularly during training when an optimal architecture is still being learned. As a result, comparing machine learning jobs executed on different types of computing devices to predict performance of a machine learning job is difficult.

The recommendation engine implementing the subject matter can improve the performance of a heterogeneous distributed computing network that generally includes a number of computing devices that are non-fungible, i.e., are not able to perform the same operations at all or with the same level of efficiency and accuracy as other computing devices in the network. Homogenizing a distributed computing network to include computing devices of a single device is cost-prohibitive and inefficient, especially because a heterogeneous distributed computing network is flexible to executing different jobs optimized for certain types of computing devices. Therefore, the recommendation engine can leverage the variety of computing device types in a distributed computing network to facilitate generating schedules and/or recommendations tailored for each input job.

Also from the set of performance metrics, the recommendation engine can generate recommendations for a user to analyze. The recommendations can be reports that indicate recommended computing device types to execute a job on, to provide new insight as to which types of computing devices are better for executing a particular job than others.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
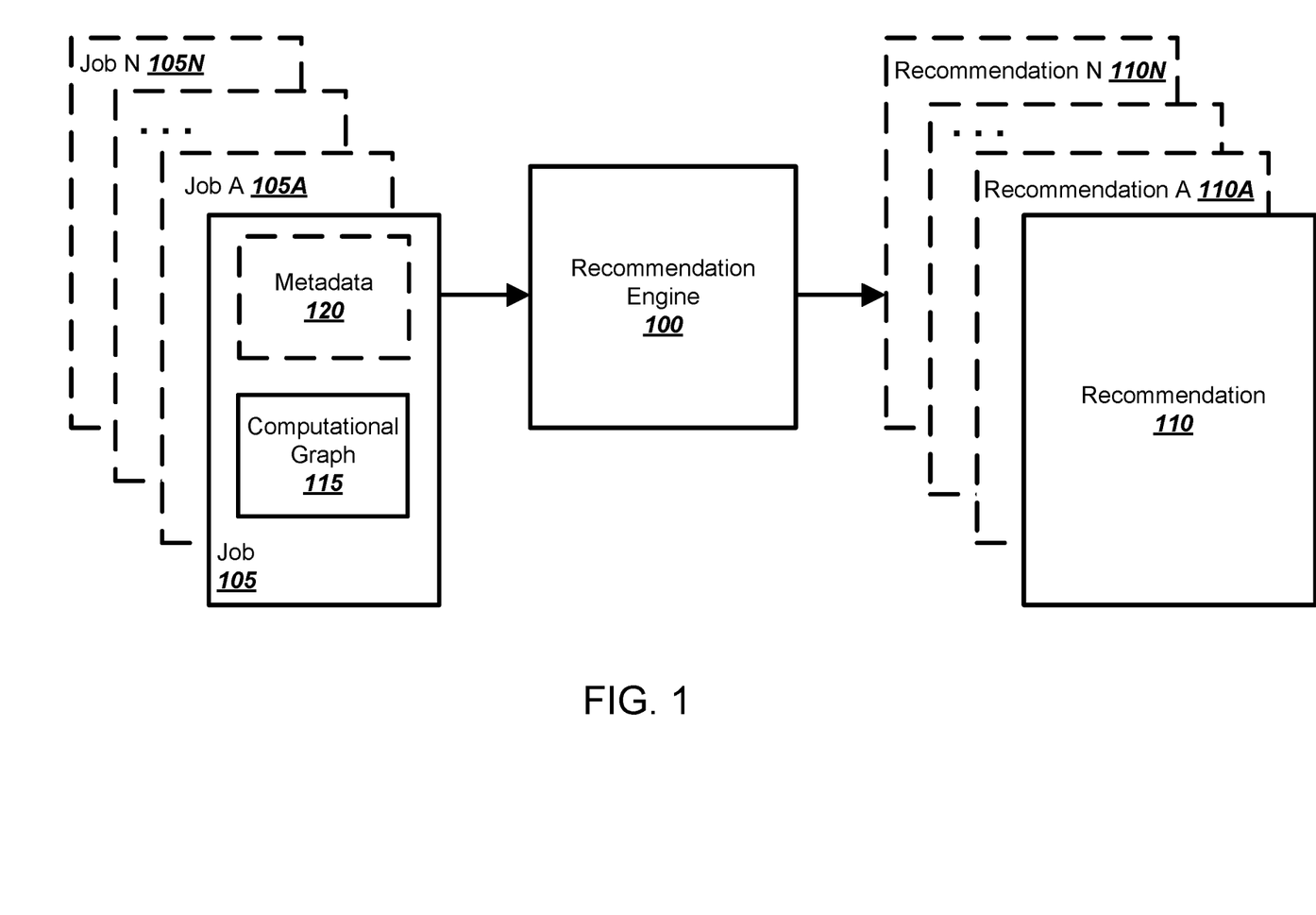
FIG. 1 illustrates an example recommendation engine.

FIG. 1 illustrates an example recommendation engine 100. The recommendation engine 100 can receive a job 105, as input, and generate a recommendation 110, as output. Optionally, the recommendation engine 100 can be configured to receive a plurality of jobs 105A-N and generate a plurality of recommendations 110A-N. Description of the jobs and recommendations will be made in reference to the job 105 and the recommendation 110.

Computing device types are different categories of computing devices grouped by a common characteristic. Computing device types can include: architectural features, e.g., memory or processing capacity; processor or circuit logic, e.g., FGPA, ASIC, or TPU; and generations within a same family of computing device, e.g., a first-generation TPU or a second-generation TPU.

The recommendation 110 is a recommendation for which certain types of computing devices of a plurality of different types of computing devices of a distributed computing network are recommended by the recommendation engine 100 for executing the job 105.

The recommendation 110 can provide suggestions, e.g., as a text report, to a user for which types of computing devices to execute the job 105 on, according to different characteristics of the computing devices. These characteristics can include a recommended device memory-size, model, and how computing devices in the distributed computing network assigned the job 105 should be arranged relative to one another for improved execution of the job 105.

In addition to a recommendation of one or more types of computing device to assign the job to, the recommendation 110 can include a value quantifying how much computing resources from each type of computing device should be allocated for the job. For example, the recommendation 110 can include a quantity of devices of each type, e.g., two accelerators of a first type and three accelerators of a second type; or, the recommendation can include a ratio of devices, e.g., a 3:1 ratio between computing devices of two different types.

In some implementations, the value quantifying the computing resources of each type of computing device can be specified in terms of aggregate computational resources. For example, the recommendation 110 recommends assigning enough computing devices of a first type such that a total amount of compute resources assigned from the first type of computing device meets a recommended threshold.

The recommendation 110 can also include hints or reasons for why the recommendation engine 100 generated recommendations as it did, e.g., reasons explaining the similarity in performance of a recommended type of computing device relative to other types. The reasons can also include previous observations for the performance of jobs similar to the job 105 on recommended types of computing devices in the past, e.g., an observation that jobs that include many convolutional operations perform better on the recommended types of computing devices, e.g., because of the hardware configuration of the computing devices.

The recommendation engine 100 is configured to rank each type of computing device corresponding a respective performance metric in the set of performance metrics. The ranking depends on the objective function used to generate the performance metrics. The objective function can be any function measuring a characteristic of a given job that is of interest, e.g., run-time performance, energy cost, or productivity as a function of computing resources dedicated to the job.

For example, if the objective function measures performance of each type of computing device by computational throughput while executing a given job, then the recommendation engine 100 ranks types of computing devices with respective metrics representing higher throughput over other types of computing devices with respective metrics representing lower throughput.

As another example, the recommendation engine 100 can generate performance metrics using an objective function that measures performance of each type of computing device by energy consumption while executing a given job. With this example objective function, the recommendation engine 100 is configured to rank certain types of computing devices with overall lower energy consumption higher than other types of computing devices with overall higher energy consumption.

The recommendation can be hand-written as a product of expert analysis, the recommendation engine 100 can be configured to infer reasons or hints automatically, or the recommendation engine 100 can be configured to generate recommendations both automatically and using expert analysis. In some implementations, the recommendation engine 100 is configured to infer reasons or hints by making correlations between characteristics of a type of computing device with the performance ranking for that type of computing device.

For example, the recommendation engine 100 can generate a recommendation that identifies a larger memory capacity with better performing types of computing devices, because the recommendation engine 100 correlates higher ranking types of computing devices with having a larger memory capacity. The recommendation engine 100 can correlate multiple characteristics of each type of computing device with its respective performance metric to generate a richer recommendation.

The job 105 can collectively represent operations represented in a computational graph 115 and optional metadata 120 related to the computational graph 115 or the job 105 itself. A computational graph is graph of nodes each connected to at least one other node by an edge. Each node represents an operation to be performed by one or more computing devices in a distributed computing network. For any two nodes u and v in the computation graph, an edge (u, v) is a directed edge and represents a data dependency from u to v. A data dependency from u to v means the operation represented by node u generates an output that is input to the operation represented by node v.

The operations in the computational graph 115 can be operations of a software program configured for execution on a distributed computing network. For example, operations in the computational graph 115 can be operations for training or executing a machine learning model, e.g., a neural network.

The metadata 120 can include information about the job 105, e.g., a job name, information about the user sending the job 105 to the recommendation engine 100, a priority level for assigning the job 105 as compared with other jobs, and a predetermined resource allocation requirement for the job 105. The metadata 120 can also include statistics for the computational graph collected while the computational graph was compiled, e.g., floating-point operations per second ("FLOPS"), and average or peak memory usage. The metadata 120 can also include statistics for the computational graph collected while the computational graph was executed, e.g., memory usage, processor core usage, and statistical information types of computing devices having previously executed the job 105, e.g., FLOPS or duty cycle.

Figure 2:
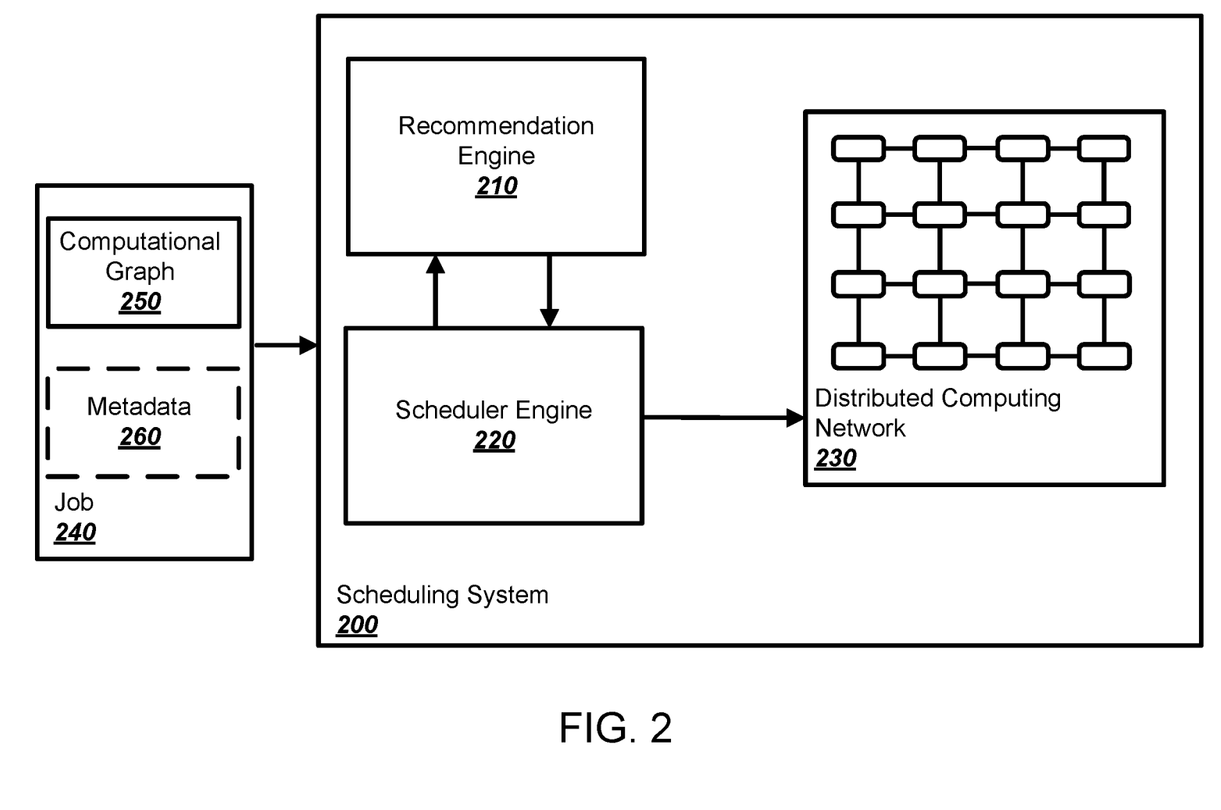
FIG. 2 illustrates an example scheduling system.

FIG. 2 shows an example scheduling system 200. The scheduling system 200 includes a recommendation engine 210, a scheduler engine 220, and a distributed computing network 230. The scheduling system 200 can receive, as input, a job 240 that includes a computational graph 250 and optional metadata 260. Although the example scheduling system 200 is shown as configured to receive the job 240 that includes operations represented as a computational graph, the scheduling system 200 can be configured in other implementations to receive data representing the operations for the job 240 in other formats, e.g., as a series of function calls of an appropriately configured Application Program Interface ("API").

The scheduler engine 220 is configured to send the computational graph 250 and the optional metadata 260 to the recommendation engine 210. The recommendation engine 210 is configured to predict a set of performance metrics for each type of computing device in the distributed computing network 230 and generate recommendations for scheduling operations to different types of hardware accelerators, using the performance metrics. Then, the scheduler engine 220 can receive the recommendations from the recommendation 210.

The scheduler engine 220 can be any conventional scheduling system for scheduling jobs on a distributed computing environment. The scheduler engine 220 can implement any conventional scheduling algorithm for scheduling jobs to the distributed computing network 230, augmented with the recommendations from the recommendation engine 210.

For example, the scheduler engine 220 can implement priority scheduling using a set of characteristics for the job 240, in addition to the recommendations generated by the recommendation engine 210. The set of characteristics the scheduler engine 220 uses to schedule the job 240 can include, for example, a user-assigned priority level and characteristics about a user submitting the job 240 for scheduling, e.g., a priority level for the user to have access sending jobs to the distributed computing network 230. The characteristics can be obtained from the metadata 260 or from another source, e.g., user-provided.

In addition to a set of characteristics for the job 240, the scheduler engine 220 can schedule jobs according to globally-imposed requirements, e.g., to schedule jobs of a certain type with higher priority than others, or to favor some types of computing devices over others, e.g., because of energy cost.

In scheduling the job 240, the scheduler engine 220 can partition the computational graph 250 into a plurality of subgraphs. Each subgraph is linked to another subgraph by an edge, representing the flow of data as output from one subgraph to input for another subgraph.

The scheduler engine 220 can decide which computing devices to assign a respective subgraph based on the recommendations generated by the recommendation engine 210. For example, the recommendation engine 210 can indicate that a first type of computing device is better performed to process the job 240, predicting a higher performance metric for the first type of computing device over other types of computing devices in the distributed computing network 230. Then, using the recommendations, the scheduler engine 220 can partition the computational graph 250 into a plurality of subgraphs and assign the subgraphs with a preference to the first type of computing device.

The scheduling is described as a "preference" to the first type of computing device because other imposed requirements to the scheduler engine 220 can still result in the scheduler engine 220 scheduling subgraphs to a computing device type that is ranked lower by performance metric, and subsequently, by recommendation. In general, the set of performance metrics from the recommendation engine 210 enriches the decision-making by the scheduler engine 220 in assigning subgraphs to the distributed computing network 230.

For example, if computing devices of a highest ranked performance metric are unavailable in the distributed computing environment 230, e.g., because those computing devices are not currently in operation, the scheduler engine 230 can schedule a job on computing devices of a type that is less-recommended by the recommendation engine 210 according to the received recommendations. As another example, the scheduler engine 230 can be configured to assign more highly recommended types of computing devices to the job 240 depending on a priority level assigned to the job 240 or the status of the user from which the job 240 originated.

Figure 3:
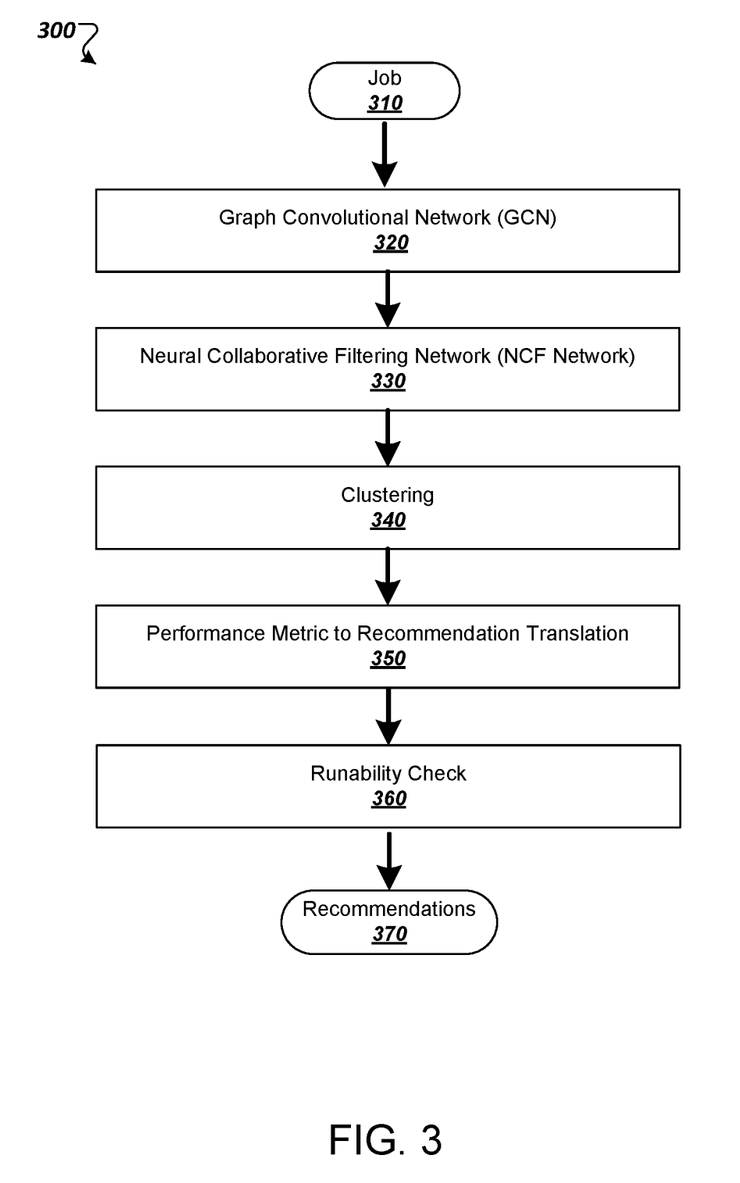
FIG. 3 illustrates a recommendation pipeline using a machine learning model.

FIG. 3 illustrates a recommendation pipeline 300 using a machine learning model. A recommendation engine can be configured to process an input job 310 and generate performance metrics 360 using the recommendation pipeline 300. As described above with reference to FIG. 1 and FIG. 2, the performance metrics 360 can then be sent to a scheduling system for scheduling the job 310, and/or be used to generate a recommendation.

The recommendation pipeline 300 begins with the input job 310 having a computational graph and optional metadata, as described above. A graph convolutional neural network 320 can receive the computational graph of the input job 310 and the metadata.

A graph convolutional neural network is a neural network having a plurality of layers, including an input layer and an output layer that receives a graph as input and performs convolutional operations on the input graph. The graph convolutional neural network 320 can be trained to receive, as input, the computational graph, and generate, as output, an embedding representing features of the computational graph. An embedding from a graph convolutional neural network can represent features from neighboring nodes of a given node in the computational graph, to generate embeddings representing "similar" computational graphs. Features from neighboring nodes of a given node can be performed by performing convolutional operations on the neighboring nodes.

The graph convolutional neural network 320 can be trained jointly with a neural collaborative filtering network—described below—to generate embeddings for similar computational graphs according to an objective function. When the graph convolutional neural network 320 and the neural collaborative filtering network are trained jointly, resultant output from the neural collaborative filtering network is a set of performance metrics for each type of computing device, even for computing device types where historical data of performance for the type of input job is sparse or non-existent.

Turning to the architectural details of the graph convolutional neural network ("GCN") 320, at each layer, the GCN 320 can execute one or more activation functions from respective input received at the layer. The one or more activation functions can be any conventional activation function, e.g., ReLU, sigmoid, or tanh.

Also at each layer, the GCN 320 can generate multiple outputs from one or more activation functions at the layer, to extract features from each node in the computational graph, as well as to extract separate features from inputs and outputs to each node in the computational graph, and features from neighbors of the node. To do so, the recommendation engine can, for example, augment the computational graph to include self-loops at each node in the computational graph, to extract features at not only neighboring nodes to any given node in the computational graph, but the given node itself.

To extract features from inputs and outputs of a given node in the computational graph separately, the GCN 320 can separately aggregate activation function outputs for outputs and inputs of the node, respectively, to learn whether performance of the computational graph on a particular type of computing device is dominated by the inputs or the outputs.

The recommendation engine can update the weights using a backpropagation technique, e.g., backpropagation using stochastic gradient descent. For each layer, the recommendation engine can compute a gradient of the activation function against a ground-truth value. The ground-truth can be the historical performance metric of a computational graph on each type of computing device. The recommendation engine can update weights based on the computed gradient of activation outputs that include at least one of: (i) the respective output of the node-wise computation, (ii) the aggregated respective activation outputs of each node output of each node in the layer, or (iii) the aggregated respective activation outputs of each node input of each node in the layer.

Equation 1 is an example layer-wise propagation rule for the GCN 320:

$$H^{l+1} = \sigma([\hat{D}_{out}^{-1}\hat{A}H^lV^l, \hat{D}_{in}^{-1}\hat{A}^TH^lW^l])$$ EQUATION 1 l is a layer in the GCN 320 and $H^l$ is a tensor of activation functions at layer l. A tensor is a multidimensional array of numeric or other values, e.g., strings, having a specific order that corresponds to the dimensionality of the array. For example, a scalar value is a $0^{th}$-order tensor, a vector of numeric values is a $1^{st}$-order tensor, and a matrix is a $2^{nd}$-order tensor.

Equation 1 defines $H^{l+1}$, where $\sigma(\bullet)$ denotes an activation function, and [ ] denotes concatenation. $H^0$, i.e., the input layer, is defined as $H^0 = X \in R^{N*D}$, where X is a node feature tensor of the computational graph representing N-dimensional feature vectors for each operation represented by the computational graph, having D nodes in total.

A is an adjacency matrix of an input computational graph. An adjacency matrix is a matrix in which the elements of the matrix indicate whether nodes within the graph are adjacent, i.e., linked by a common edge, or not. In Equation 1, $\hat{A} = A + I_N$ and represents an adjacency matrix in which each node is considered adjacent to itself, i.e., each node has a self-loop to allow the GCN 320 to learn features for each given node and not just its neighbors, as described above.

Also in Equation 1, $D_{in}$ and $D_{out}$ are matrices representing the input and output degrees of each node in the computational graph. Representing the computational graph as $D_{in}$ and $D_{out}$ enables the GCN 320 to learn features of inputs and outputs of each node in the computational graph, separately, which can improve how the GCN 320 ultimately generates the embedding for the computational graph.

Also in Equation 1, $V^l$ and $W^l$ are separate trainable weight tensors for layer l. Elements of the trainable weight tensors can be updated by the recommendation engine during training.

Equation 2 is another example layer-wise propagation rule for the GCN 320, used in some implementations:

$$H^{l+1} = \sigma([H^lU^l, \hat{D}_{out}^{-1}AH^lV^l, \hat{D}_{in}^{-1}A^TH^lW^l])$$ EQUATION 2

Equation 2 is functionally equivalent to Equation 1. Rather than using an adjacency matrix $\hat{A}$ augmented with self-loops as described above in reference to Equation 1, Equation 2 includes a separate term $H^lU^l$, where $U^l$ is another trainable weight tensor for the layer l. Therefore, Equation 2 can also be used to define layers to learn features for each individual node at layer l.

Whether the GCN 320 defines each layer according to Equation 1 or Equation 2, the GCN 320 can learn a combination of, at each layer:

1. node-wise computations to capture situations in which types of operations and other features of operations represented by the node dictate performance, represented in Equation 1 by $\hat{A}$ and $\hat{A}^T$ and in Equation 2 by $H^lU^l$;
2. an aggregated activation output for each node output in the computational graph to capture situations in which outputs in the computational graph at each node dictate performance, represented in Equation 1 by $\hat{D}_{out}^{-1}\hat{A}H^lV^l$ and in Equation 2 by $\hat{D}_{out}^{-1}AH^lV^l$; and
3. an aggregated activation output for each node input in the computational graph to capture situations in which inputs in the computational graph at each node dictate performance, represented in Equation 1 by $\hat{D}_{in}^{-1}\hat{A}^TH^lW^l$ and in Equation 2 by $\hat{D}_{in}^{-1}A^TH^lW^l$.

Next in the recommendation pipeline 300, the embedding from the GCN 320 can be provided as input to a neural collaborative filtering network 330. The neural collaborative filtering network 330 can be trained to receive the embedding, as input, and generate as output, a set of performance metrics 330 for the input job 310. In general, collaborative filtering refers to a class of techniques for making predictions or recommendations for one agent in response to a task, using information collected from actions or preferences of multiple other agents in response to the same task.

The neural collaborative filtering network ("NCF network") 330 is a neural network having a plurality of layers, e.g., a feedforward neural network such as a multilayer perceptron, which has been trained to generate performance metrics that correspond to a position of an input embedding within an embedding space. The GCN 320 and the NCF network 330 can be trained jointly to generate embeddings for a plurality of computational graphs such that embeddings close to each other in the embedding space correspond to computational graphs that perform similarly according to the objective function used by the GCN 320 and the NCF network 330.

Training the GCN 320 and the NCF 330 jointly means that activation outputs during a forward pass are computed as if the GCN 320 and NCF network 330 were one neural network. Specifically, the output embedding for the GCN 320 is provided as input to the NCF network 330. The input embedding for the NCF network 330 is processed and a set of performance metrics are generated for the computational graph.

On the backward pass, weights at each layer of the NCF network 330 are updated, e.g., backpropagation using stochastic gradient descent and a loss function. The gradient obtained from the input layer of the NCF network 330 is passed to the output layer of the GCN 320, and backpropagation can continue to update the weights of each layer in the GCN 320.

The loss function used to train the NCF network 330 and the GCN 320 can be a loss between an expected set of performance metrics for a job, and a predicted set of performance metrics generated as output to the NCF network 330. The NCF network 330 and the GCN 320 can be trained until meeting a predetermined training condition, e.g., a number of iterations of weight updates, or until a computed loss function reaches a predetermined threshold.

After the recommendation engine generates the set of performance metrics using the NCF network 350, if the recommendation engine is processing a plurality of input jobs at a time, then the recommendation engine can next perform clustering 360 on respective performance metrics for each job, according to the recommendation pipeline 300. The clustering step 360 can be executed by a clustering machine learning model trained to receive a plurality of sets of performance metrics, and generate, as output, the sets of performance metrics clustered by similar performance metrics within each set. Clustering allows the recommendation engine to further identify types of computing devices that can perform better or worse for the input job 310 based on predicted performance of other jobs on those types of computing devices. In some implementations, this step is skipped.

The recommendation engine can translate a set of performance metrics to one or more recommendations 350. The recommendation engine can generate the recommendations according to a set of rules, e.g., recommend types of hardware accelerators over other types based on which types ranked higher in the set of performance metrics; or by statistical analysis, e.g., as described above with reference to FIG. 1.

Although the translation step 350 is shown as occurring after the clustering step 340 and before a runability check 360 (described below), in some implementations the translation 350 is performed after the runability check 360 or in processing pipelines in which the clustering step 340 is not performed at all.

The recommendation engine can perform the runability check 360 before providing recommendations 370 translated from the set of performance metrics. The runability check 350 is a check to ensure that types of devices recommended for performing the job 310 on can actually run the job. If a type of computing device fails the runability check 360, the recommendation engine can remove the recommendation corresponding to the type of computing device. In some implementations, the runability check 360 is not performed.

A type of computing device can fail a runability check for the input job 310 for a variety of reasons. The reasons can be tied to hardware specifications and the overall configuration of the type of computing device. For example, a type of computing device can fail a runability check if the type of computing device does not support one or more operations represented by the computational graph for the job 310.

Figure 4:
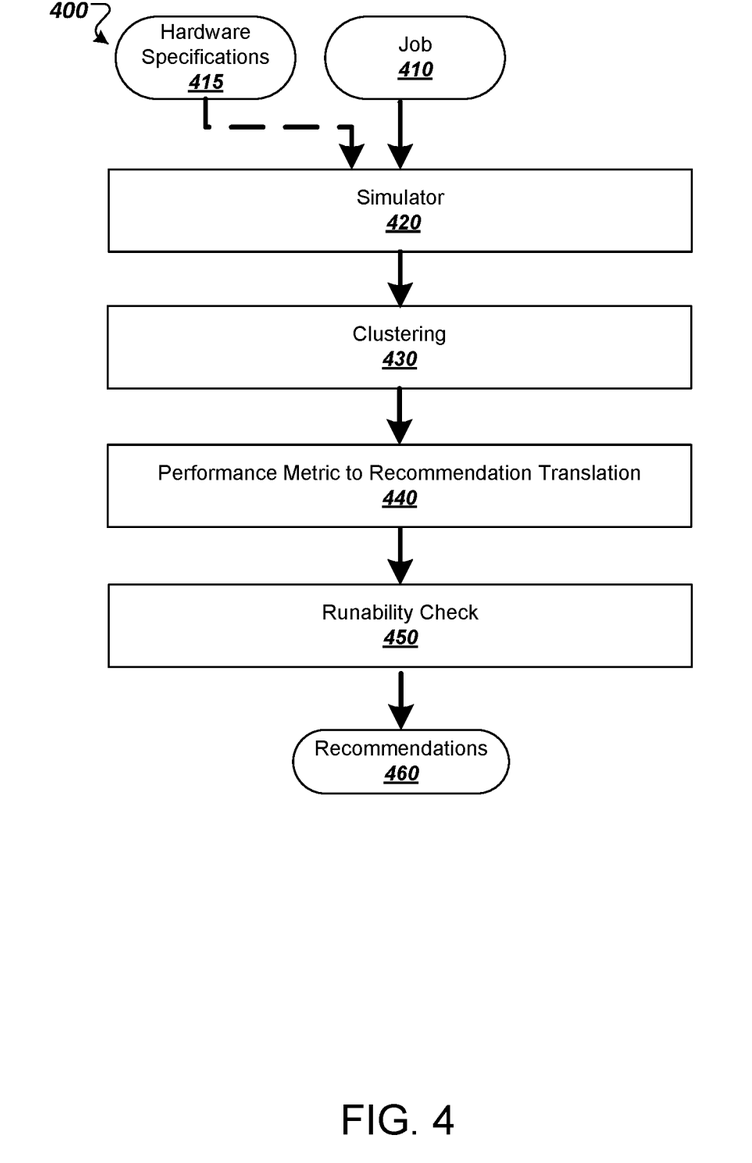
FIG. 4 illustrates a recommendation pipeline using a simulator.

FIG. 4 illustrates a recommendation pipeline 400 using a simulator 420. A simulator can be configured to simulate execution of a computational graph on different types of computing devices on a distributed computing network. To do so, the simulator 420 can receive (i) an input job 410 that includes a computational graph and optional metadata; and (ii) respective hardware specifications 415 corresponding to each type of computing device present in the distributed computing network. The solid arrows in FIG. 4 represent the flow of the recommendation pipeline 400, while the dotted arrow represents that the hardware specifications 415 can be provided to the simulator prior to executing the recommendation pipeline 400.

As described above, with reference to the scheduling system 200 of FIG. 2, the simulator 420 can be configured to receive data representing the operations in other formats besides specified in a computational graph.

The simulator 420 can be configured to simulate performance at a particular distributed computing network, by receiving, as input, the hardware specifications 415 representing each type of computing device in the distributed computing network, e.g., the number of computing devices, memory capacity/bandwidth and computational performance of each computing device, and other low-level details for the hardware specification of each computing device. A simulator can be configured to generate a set of performance metrics according to an objective function corresponding to the type of performance metric sought.

The simulator 420 can be configured to simulate performance of executing the computational graph with additional functionality and compatibility guarantees. In some implementations, the simulator 420 determines whether a type of computing device is compatible to execute the operations represented in the computational graph. In these implementations, the simulator 420 takes the role of the runability check in the pipeline.

Then, the simulator 420 can use hardware specifications for a given type of computing device and predict a performance metric for executing the input job 410 on the distributed computing network. Specifically, the simulator 420 can generate simulated results of executing the computational graph on a type of computing device, and measure a performance metric for those simulation results according to an objective function. Comparing FIG. 3 and FIG. 4, in implementations in which the simulator 420 is used, the simulator 420 replaces the GCN 320 and the NCF network 330.

The recommendation engine can perform a clustering step 430 and a runability check 450 prior to generating a recommendation 450, similar to the clustering 340 and the runability check 350 in the recommendation pipeline 300, described above with reference to FIG. 3. In some implementations, the clustering step 430 is skipped. Also, if the simulator 420 is configured to simulate executing the computational graph according to whether each type of computing device is compatible to perform the operations represented in the computational graph, then the runability check 440 can be skipped.

The processing pipeline 400 includes a performance metric to recommendation translation step 440, and the recommendation engine can be configured to receive the set of performance metrics from the simulator 420 (optionally, after the clustering step 430), and generate recommendations, as described above with reference to FIG. 3. The recommendation can generate recommendations 460 that can be provided to a scheduler for use in scheduling the job 410, and/or used to generate recommendations for a user's consumption.

The recommendation engine can be configured to generate performance metrics without recommendations corresponding to the performance metrics. For example, the recommendation engine can send performance metrics for analysis by a user or another system configured to receive a set of performance metrics as input.

In some implementations, the recommendation engine includes or is interconnected with an engine separately configured to translate recommendations from the set of performance metrics according to different rules.

In some implementations, the recommendation engine can send the performance metrics as a user-readable report and/or for display on a display of a user device. The sent performance metrics can be further processed for analysis, e.g., the recommendation engine can generate statistical data from the performance metrics for analysis.

Figure 5:
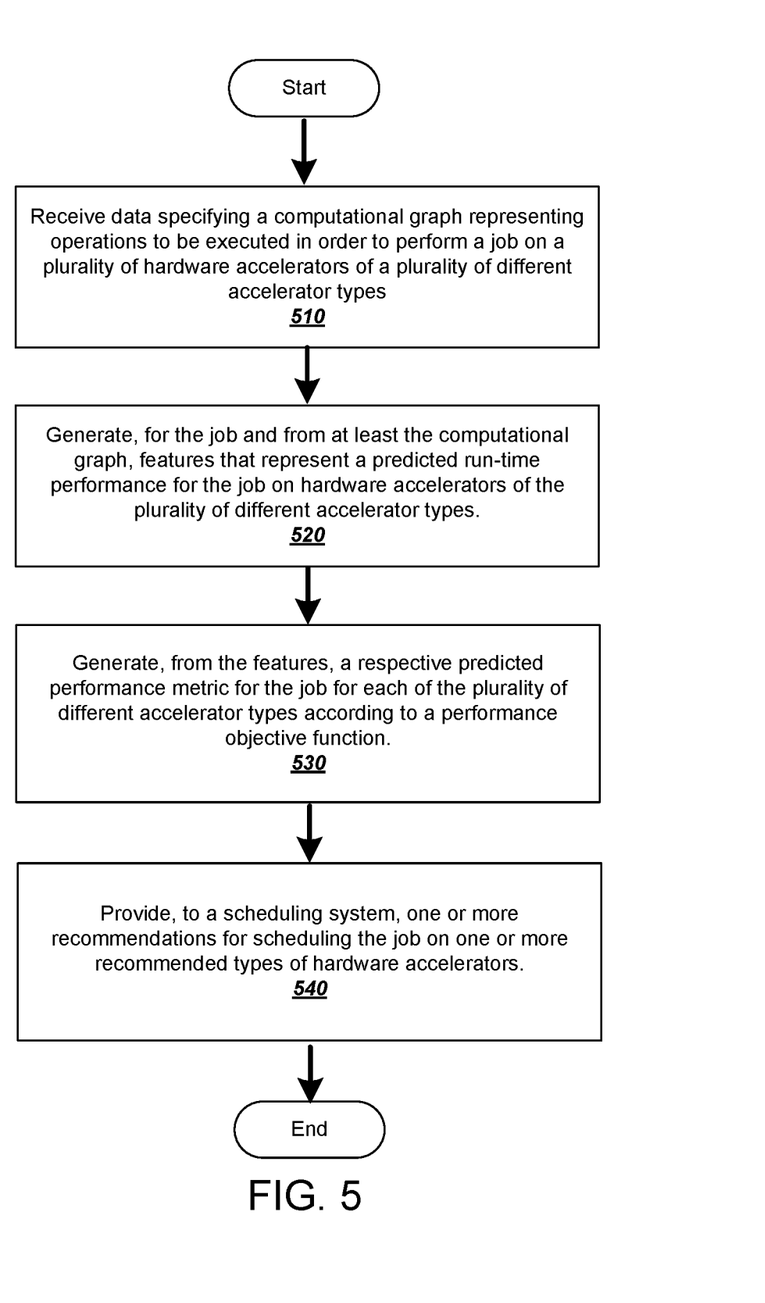
FIG. 5 is a flowchart of an example process for generating performance metrics for a scheduling system.

FIG. 5 is a flowchart of an example process 500 for generating performance metrics by a recommendation engine. For convenience, the process 500 will be described as being performed by an engine of one or more computers, located in one or more locations, and programmed appropriately in accordance with this specification. For example, a recommendation engine, e.g., the recommendation engine 100 of FIG. 1, appropriately programmed, can perform the process 500.

Receive, by the recommendation engine, data representing operations to be executed in order to perform a job on a plurality of computing devices of a plurality of different computing device types (step 510). As described with reference to FIG. 1, the recommendation engine can receive data specifying a computational graph and part of a job. The operations can correspond to any software program, including operations to train and/or execute a machine learning model.

Generate, by the recommendation engine, for the job and from at least the data representing the operations, features that represent a predicted performance for the job on computing devices of the plurality of different computing device types (step 520). As described above with reference to FIG. 1 and FIG. 2, the recommendation engine can extract features, e.g., as an embedding. In implementations in which the recommendation engine simulates a distributed computing network, the features extracted can be simulation results for each type of computing device in a distributed computing network.

Generate, by the recommendation engine and from the features, a respective predicted performance metric for the job for each of the plurality of different computing device types according to a performance objective function (step 530). As described in FIG. 3 and FIG. 4, the recommendation engine can generate predicted performance metrics using a machine learning model or a simulator for the distributed computing network.

Provide, to a scheduling system, one or more recommendations for scheduling the job on one or more recommended types of hardware accelerators (step 540). The recommendations can be for recommended types and amounts of computing resources to assign. The scheduling system is configured to schedule the job for execution (i) by one or more of the plurality of hardware accelerators and (ii) based on data that includes the one or more recommendations (step 540). As described above with reference to FIG. 2, the recommendation engine can provide the recommendations to a scheduler engine, which, in turn, can schedule an input job using the performance metrics and additional data.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Implementation 1 is a method comprising: receiving data representing operations to be executed in order to perform a job on a plurality of hardware accelerators of a plurality of different accelerator types; generating, for the job and from at least the data representing the operations, features that represent a predicted performance for the job on hardware accelerators of the plurality of different accelerator types; generating, from the features, a respective predicted performance metric for the job for each of the plurality of different accelerator types according to a performance objective function; and providing, to a scheduling system, one or more recommendations for scheduling the job on one or more recommended types of hardware accelerators, wherein the scheduling system is configured to schedule the job for execution (i) by one or more of the plurality of hardware accelerators and (ii) based on data that includes the one or more recommendations.

Implementation 2 is the method of implementation 1, wherein providing one or more recommendations comprises: translating the respective predicted performance metrics for the job into the one or more recommendations according to a statistical analysis of the respective predicted performance metrics.

Implementation 3 is the method of any one of implementations 1 through 2, wherein the machine learning system comprises a graph convolutional neural network having a plurality of layers and trained to generate embeddings from features extracted from computational graphs.

Implementation 4 is the method of any one of implementations 1 through 3, wherein the data representing the operations specifies a computational graph representing the operations, wherein the features comprise an embedding of the computational graph in an embedding space, and wherein generating the features comprises executing the operations represented by the computational graph using a machine learning system that has been trained to generate embeddings in the embedding space such that positions of an embedding in the embedding space reflects a respective performance metric of the computational graph on each of the plurality of different accelerator types according to the performance objective function.

Implementation 5 is the method of any one of implementations 1 through 4, wherein the machine learning system comprises a graph convolutional neural network having a plurality of layers and trained to generate embeddings from features extracted from computational graphs.

Implementation 6 is the method of any one of implementations 1 through 5, wherein the graph convolutional neural network is configured to, at each layer of a plurality of layers: generate a respective output of a node-wise computation for each node in the layer, aggregate respective activation outputs of a respective activation function performed at the layer on each node output of each node in the layer, aggregate respective activation outputs of a respective activation function performed at the layer on each node input for each node in the layer, and update respective weights corresponding to the layer based on a computed gradient of at least one of: (i) the respective output of the node-wise computation, (ii) the aggregated respective activation outputs of each node output of each node in the layer, and (iii) the aggregated respective activation outputs of each node input of each node in the layer.

Implementation 7 is the method of any one of implementations 1 through 6, wherein generating, from the features, a respective predicted performance metric for the job for each of the plurality of different accelerator types comprises performing a collaborative filtering on the embeddings.

Implementation 8 is the method of any one of implementations 1 through 7, wherein the machine learning system comprises a neural collaborative filtering network trained to receive embeddings from the graph convolutional neural network and perform a collaborative filtering on the embeddings to generate the respective predicted performance metric for each of the plurality of accelerator types according to the performance objective function.

Implementation 9 is the method of any one of implementations 1 through 8, wherein the neural collaborative filtering network and the graph convolutional neural network are trained jointly.

Implementation 10 is the method of any one of implementations 1 through 9, wherein generating the respective predicted performance metric for the job for each of the plurality of different accelerator types comprises: performing, by a simulator, a simulation of executing the operations on the plurality of different accelerator types; and measuring performance of the simulation for each accelerator type as a respective performance metric for the accelerator type and according to the performance objective function.

Implementation 11 is the method of any one of implementations 1 through 10, wherein the performance metric and the performance objective function are one of: a cost performance metric and a cost objective function, a run-time performance metric and a run-time objective function, or an energy performance metric and an energy objective function.

Implementation 12 is a system comprising: one or more computers and one or more storage devices storing instructions that are operable, when executed by the one or more computers, to cause the one or more computers to perform the method of any one of claims 1 to 11.

Embodiment 13 is a computer storage medium encoded with a computer program, the program comprising instructions that are operable, when executed by data processing apparatus, to cause the data processing apparatus to perform the method of any one of claims 1 to 11.

In addition to the implementations of the attached claims and the implementations described above, the following numbered implementations are also innovative:

What is claimed is:

1. A system comprising:
one or more computers and one or more storage devices on which are stored instructions that are operable, when executed by the one or more computers, to cause the one or more computers to perform operations comprising:
receiving data representing operations of a job to be executed in order to perform the job on a plurality of hardware accelerators of a plurality of different accelerator types;
generating, for the job and from at least the data representing the operations, features of the operations of the job, the features representing a predicted performance for the job being performed on hardware accelerators of the plurality of different accelerator types;
generating, from the features, a respective predicted performance metric for each of the plurality of different accelerator types performing the job according to a performance objective function for the job, wherein the respective predicted performance metric for each of the plurality of different accelerator types measures the predicted performance of one or more of the hardware accelerators of the accelerator type performing the job; and
providing, to a scheduling system, one or more recommendations determined based on the respective predicted performance metrics for scheduling the job to be performed on one or more recommended types of hardware accelerators, wherein the scheduling system is configured to schedule the operations of the job for execution (i) by one or more of the plurality of hardware accelerators and (ii) based on the one or more recommendations.

2. The system of claim 1, wherein providing one or more recommendations determined based on the respective predicted performance metrics comprises:
translating the respective predicted performance metrics for the job into the one or more recommendations according to a statistical analysis of the respective predicted performance metrics.

3. The system of claim 2, wherein the one or more recommendations comprise text, and wherein translating the respective predicted performance metrics for the job comprises adding predetermined text corresponding to a recommended one of the one or more recommended types of hardware accelerators.

4. The system of claim 1,
wherein the data representing the operations of the job specifies a computational graph representing the operations,
wherein the features comprise an embedding of the computational graph in an embedding space, and
wherein generating the features comprises processing the operations represented by the computational graph using a machine learning system that has been trained to generate embeddings in the embedding space such that positions of an embedding in the embedding space reflects a respective performance metric of the operations represented by the computational graph being executed on each of the plurality of different accelerator types according to the performance objective function.

5. The system of claim 4, wherein the machine learning system comprises a graph convolutional neural network having a plurality of layers and trained to generate embeddings of computational graphs.

6. The system of claim 5, wherein the graph convolutional neural network is configured to, at each layer of a plurality of layers:
generate a respective output of a node-wise computation for each node in the layer,
aggregate respective activation outputs of a respective activation function performed at the layer on each node output of each node in the layer,
aggregate respective activation outputs of a respective activation function performed at the layer on each node input for each node in the layer, and
update respective weights corresponding to the layer based on a computed gradient of at least one of:

(i) the respective output of the node-wise computation,
(ii) the aggregated respective activation outputs of each node output of each node in the layer, and
(iii) the aggregated respective activation outputs of each node input of each node in the layer.

7. The system of claim 5, wherein generating, from the features, a respective predicted performance metric for the job being performed by each of the plurality of different accelerator types comprises performing a collaborative filtering on the embeddings.

8. The system of claim 7, wherein the machine learning system comprises a neural collaborative filtering network trained to receive embeddings from the graph convolutional neural network and perform a collaborative filtering on the embeddings to generate the respective predicted performance metric for each of the plurality of accelerator types performing the job according to the performance objective function.

9. The system of claim 8, wherein the neural collaborative filtering network and the graph convolutional neural network are trained jointly.

10. The system of claim 1, wherein generating the respective predicted performance metric for the job being performed by each of the plurality of different accelerator types comprises:
performing, by a simulator, a simulation of executing the operations on the plurality of different accelerator types; and
measuring performance of the simulation for each accelerator type as a respective performance metric for the accelerator type and according to the performance objective function.

11. The system of claim 1, wherein the performance metric and the performance objective function are one of:
a cost performance metric and a cost objective function,
a run-time performance metric and a run-time objective function, or
an energy performance metric and an energy objective function.

12. A method comprising:
receiving data representing operations of a job to be executed in order to perform the job on a plurality of hardware accelerators of a plurality of different accelerator types;
generating, for the job and from at least the data representing the operations, features of the operations of the job, the feature representing a predicted performance for the job being performed on hardware accelerators of the plurality of different accelerator types;
generating, from the features, a respective predicted performance metric for each of the plurality of different accelerator types performing the job according to a performance objective function for the job, wherein the respective predicted performance metric for each of the plurality of different accelerator types measures the predicted performance of one or more of the hardware accelerators of the accelerator type performing the job; and
providing, to a scheduling system, one or more recommendations determined based on the respective predicted performance metrics for scheduling the job to be performed on one or more recommended types of hardware accelerators, wherein the scheduling system is configured to schedule the operations of the job for execution (i) by one or more of the plurality of hardware accelerators and (ii) based on the one or more recommendations.

13. The method of claim 12, wherein providing one or more recommendations determined based on the respective predicted performance metrics comprises:
translating the respective predicted performance metrics for the job into the one or more recommendations according to a statistical analysis of the respective predicted performance metrics.

14. The method of claim 13, wherein the one or more recommendations comprise text, and wherein translating the respective predicted performance metrics for the job comprises adding predetermined text corresponding to a recommended one of the one or more recommended types of hardware accelerators.

15. The method of claim 12,
wherein the data representing the operations of the job specifies a computational graph representing the operations,
wherein the features comprise an embedding of the computational graph in an embedding space, and
wherein generating the features comprises processing the operations represented by the computational graph using a machine learning method that has been trained to generate embeddings in the embedding space such that positions of an embedding in the embedding space reflects a respective performance metric of the operations represented by the computational graph being executed on each of the plurality of different accelerator types according to the performance objective function.

16. The method of claim 15, wherein the machine learning method comprises a graph convolutional neural network having a plurality of layers and trained to generate embeddings of computational graphs.

17. The method of claim 16, wherein the graph convolutional neural network is configured to, at each layer of a plurality of layers:
generate a respective output of a node-wise computation for each node in the layer,
aggregate respective activation outputs of a respective activation function performed at the layer on each node output of each node in the layer,
aggregate respective activation outputs of a respective activation function performed at the layer on each node input for each node in the layer, and
update respective weights corresponding to the layer based on a computed gradient of at least one of:
(i) the respective output of the node-wise computation,
(ii) the aggregated respective activation outputs of each node output of each node in the layer, and
(iii) the aggregated respective activation outputs of each node input of each node in the layer.

18. The method of claim 16, wherein generating, from the features, a respective predicted performance metric for the job being performed by each of the plurality of different accelerator types comprises performing a collaborative filtering on the embeddings.

19. The method of claim 18, wherein the machine learning method comprises a neural collaborative filtering network trained to receive embeddings from the graph convolutional neural network and perform a collaborative filtering on the embeddings to generate the respective predicted performance metric for each of the plurality of accelerator types performing the job according to the performance objective function.

20. The method of claim 19, wherein the neural collaborative filtering network and the graph convolutional neural network are trained jointly.

21. The method of claim 12, wherein generating the respective predicted performance metric for the job being performed by each of the plurality of different accelerator types comprises:
- performing, by a simulator, a simulation of executing the operations on the plurality of different accelerator types; and
- measuring performance of the simulation for each accelerator type as a respective performance metric for the accelerator type and according to the performance objective function.

22. The method of claim 12, wherein the performance metric and the performance objective function are one of:
- a cost performance metric and a cost objective function,
- a run-time performance metric and a run-time objective function, or
- an energy performance metric and an energy objective function.

23. One or more non-transitory computer-readable storage media encoded with instructions that, when executed by one or more computers, cause the one or more computers to perform operations comprising:
- receiving data representing operations of a job to be executed in order to perform the job on a plurality of hardware accelerators of a plurality of different accelerator types;
- generating, for the job and from at least the data representing the operations, features of the operations of the job, the features representing a predicted performance for the job being performed on hardware accelerators of the plurality of different accelerator types;
- generating, from the features, a respective predicted performance metric for each of the plurality of different accelerator types performing the job according to a performance objective function for the job, wherein the respective predicted performance metric for each of the plurality of different accelerator types measures the predicted performance of one or more of the hardware accelerators of the accelerator type performing the job; and
- providing, to a scheduling system, one or more recommendations determined based on the respective predicted performance metrics for scheduling the job to be performed on one or more recommended types of hardware accelerators, wherein the scheduling system is configured to schedule the operations of the job for execution (i) by one or more of the plurality of hardware accelerators and (ii) based on the one or more recommendations.

24. The computer-readable storage media of claim 23, wherein providing one or more recommendations determined based on the respective predicted performance metrics comprises:
- translating the respective predicted performance metrics for the job into the one or more recommendations according to a statistical analysis of the respective predicted performance metrics.

25. The computer-readable storage media of claim 24, wherein the one or more recommendations comprise text, and wherein translating the respective predicted performance metrics for the job comprises adding predetermined text corresponding to a recommended one of the one or more recommended types of hardware accelerators.

26. The computer-readable storage media of claim 23, wherein the data representing the operations of the job specifies a computational graph representing the operations,
wherein the features comprise an embedding of the computational graph in an embedding space, and
wherein generating the features comprises processing the operations represented by the computational graph using a machine learning computer-readable storage media that has been trained to generate embeddings in the embedding space such that positions of an embedding in the embedding space reflects a respective performance metric of the operations represented by the computational graph being executed on each of the plurality of different accelerator types according to the performance objective function.

27. The computer-readable storage media of claim 26, wherein the machine learning computer-readable storage media comprises a graph convolutional neural network having a plurality of layers and trained to generate embeddings of computational graphs.

28. The computer-readable storage media of claim 27, wherein the graph convolutional neural network is configured to, at each layer of a plurality of layers:
- generate a respective output of a node-wise computation for each node in the layer,
- aggregate respective activation outputs of a respective activation function performed at the layer on each node output of each node in the layer,
- aggregate respective activation outputs of a respective activation function performed at the layer on each node input for each node in the layer, and
- update respective weights corresponding to the layer based on a computed gradient of at least one of:
  (i) the respective output of the node-wise computation,
  (ii) the aggregated respective activation outputs of each node output of each node in the layer, and
  (iii) the aggregated respective activation outputs of each node input of each node in the layer.

29. The computer-readable storage media of claim 27, wherein generating, from the features, a respective predicted performance metric for the job being performed by each of the plurality of different accelerator types comprises performing a collaborative filtering on the embeddings.

30. The computer-readable storage media of claim 29, wherein the machine learning computer-readable storage media comprises a neural collaborative filtering network trained to receive embeddings from the graph convolutional neural network and perform a collaborative filtering on the embeddings to generate the respective predicted performance metric for each of the plurality of accelerator types performing the job according to the performance objective function.

31. The computer-readable storage media of claim 30, wherein the neural collaborative filtering network and the graph convolutional neural network are trained jointly.

32. The computer-readable storage media of claim 23, wherein generating the respective predicted performance metric for the job being performed by each of the plurality of different accelerator types comprises:
- performing, by a simulator, a simulation of executing the operations on the plurality of different accelerator types; and
- measuring performance of the simulation for each accelerator type as a respective performance metric for the accelerator type and according to the performance objective function.

33. The computer-readable storage media of claim 23, wherein the performance metric and the performance objective function are one of:
- a cost performance metric and a cost objective function, a run-time performance metric and a run-time objective function, or an energy performance metric and an energy objective function.

* * * * *